United States Patent
Koo et al.

(10) Patent No.: US 8,849,293 B2
(45) Date of Patent: Sep. 30, 2014

(54) HANDLING IN-DEVICE COEXISTENCE INTERFERENCE

(75) Inventors: Changhoi Koo, Plano, TX (US); Zhijun Cai, Euless, TX (US); Jun Li, Richardson, TX (US)

(73) Assignee: Blackberry Limited, Waterloo, Ontario (CA)

( * ) Notice: Subject to any disclaimer, the term of this patent is extended or adjusted under 35 U.S.C. 154(b) by 80 days.

(21) Appl. No.: 13/562,760

(22) Filed: Jul. 31, 2012

(65) Prior Publication Data

US 2014/0038621 A1 Feb. 6, 2014

(51) Int. Cl.
*H04W 72/00* (2009.01)

(52) U.S. Cl.
USPC .......... 455/450; 455/114.2; 455/501; 370/333

(58) Field of Classification Search
CPC ...... H04W 52/24; H04W 40/16; H04W 72/00
USPC .......... 455/501, 450, 114.2; 370/333
See application file for complete search history.

(56) References Cited

U.S. PATENT DOCUMENTS

| | | | |
|---|---|---|---|
| 2012/0040620 A1* | 2/2012 | Fu et al. | 455/63.1 |
| 2012/0040715 A1 | 2/2012 | Fu | |
| 2012/0082140 A1 | 4/2012 | Lin | |
| 2012/0087341 A1 | 4/2012 | Jang | |
| 2012/0207040 A1* | 8/2012 | Comsa et al. | 370/252 |

FOREIGN PATENT DOCUMENTS

| | | |
|---|---|---|
| WO | WO2010092851 | 8/2010 |
| WO | 2012021879 | 2/2012 |
| WO | 2012051952 | 4/2012 |
| WO | WO2012044327 A1 | 4/2012 |
| WO | WO2012044328 A1 | 4/2012 |
| WO | WO2012044329 A1 | 4/2012 |
| WO | 2012092851 | 7/2012 |

OTHER PUBLICATIONS

Koo et al., U.S. Appl. No. 13/069,751 entitled Method and Apparatus for Interference Identification on Configuration of LTE and BT filed Mar. 23, 2011 (44 pages).
Koo et al., U.S. Appl. No. 13/069,828 entitled Method and Apparatus for Interference Identification on Configuration of LTE and BT filed Mar. 23, 2011 (57 pages).
Koo et al., U.S. Appl. No. 13/069,912 entitled Method and Apparatus for Interference Identification on Configuration of LTE and BT filed Mar. 23, 2011 (56 pages).
Koo et al., U.S. Appl. No. 13/194,380 entitled Enhanced In-Device Coexistence Interference Avoidance using Predetermined Downlink Channel filed Jul. 29, 2011 (45 pages).
Koo et al., U.S. Appl. No. 13/289,695 entitled Access Procedures for In-Device Coexistence Interference Avoidance filed Mar. 23, 2011 (46 pages).

(Continued)

*Primary Examiner* — Wayne Cai
*Assistant Examiner* — Chuck Huynh
(74) *Attorney, Agent, or Firm* — Trop Pruner & Hu, P.C.

(57) ABSTRACT

A user equipment is able to transmit, to a wireless access node, an indication of in-device coexistence (IDC) interference between the wireless interfaces. The user equipment can include a counter to track a number of transmissions having the indication of IDC interference.

26 Claims, 7 Drawing Sheets

(56) References Cited

OTHER PUBLICATIONS

Koo et al., U.S. Appl. No. 13/289,697 entitled Randon Access Channel Procedures for In-Device Coexistence Interference Avoidance filed Nov. 4, 2011 (48 pages).
Koo et al., U.S. Appl. No. 13/562,769 entitled Handling In-Device Coexistence Interference filed Jul. 31, 2012 (37 pages).
3GPP TS 36.321 V10.5.0 (Mar. 2012) Technical Specification 3rd Generation Partnership Project; Technical Specification Group Radio Access Network; Evolved Universal Terrestrial Radio Access (E-UTRA); Medium Access Control (MAC) protocol specification (Release 10) (54 pages).
3GPP TS 36.331 V11.0.0 (Jun. 2012) Technical Specification 3rd Generation Partnership Project; Technical Specification Group Radio Access Network; Evolved Universal Terrestrial Radio Access (E-UTRA); Radio Resource Control (RRC); Protocol specification (Release 11) (302 pages).
3GPP TR 36.816 V11.2.0 (Dec. 2011) Technical Report 3rd Generation Partnership Project; Technical Specification Group Radio Access Network; Evolved Universal Terrestrial Radio Access (E-UTRA); Study on signalling and procedure for interference avoidance for in-device coexistence (Release 11) (44 pages).
Koo et al., U.S. Appl. No. 13/194,412 entitled Enhancement of In-Device Coexistence Interference Avoidance filed Jul. 29, 2011 (57 pages).
Zhenping Hu, Status Report to TSG, TSG RAN Meeting #56, Ljubljana, Slovena, Jun. 2012 (5 pages).
European Patent Office, International Search Report dated Nov. 4, 2013 for PCT/US2013/052895 (5 pages).
European Patent Office, Written Opinion dated Nov. 4, 2013 for PCT/US2013/052895 (7 pages).
3GPP TSG-RAN WG2 Meeting #77b—Jeju, Korea, Mar. 26-30, 2012—RS-121281—Agenda Item: 76.2.2; Source: Research in Motion UK Limited; Title: Signaling Procedures for IDC operation (6 pages).
European Patent Office, International Search Report and Written Opinion dated Nov. 12, 2013 for PCT/US2013/052888 (14 pages).
3GPP TSG-RAN WG2 Meeting #78, Prague, May 21-25, 2012, R2-122641, Agenda Item: 7.6.2, Source: Renesas Mobile Europe Ltd., Title: IDS Indication Prohibition, Discussion and Decision (2 pages).
3GPP TSG-RAN WG2 Meeting #79bis, Bratislava, Slovakia, Oct. 8-12, 2012, R2-124470, Agenda Item: 7.6, Source: Research in Motion UK Limited, Title: Prohibit Mechanism with timer and counter for IDC indication, Discussion and Decison (6 pages).

* cited by examiner

HANDLING IN-DEVICE COEXISTENCE INTERFERENCE

BACKGROUND

A user equipment (UE) can include multiple wireless interfaces (e.g. wireless interfaces capable of performing radio frequency (RF) communications). The presence of multiple wireless interfaces allows the UE to communicate content using any of several different communications links. Examples of wireless interfaces that may be present in a UE include a wireless interface to communicate in a Long Term Evolution (LTE) frequency band, a wireless interface to communicate in an Industrial Scientific Medical (ISM) frequency band, or a wireless interface to communicate in a Global Navigation Satellite System (GNSS) frequency band.

BRIEF DESCRIPTION OF THE DRAWINGS

Some embodiments are described with respect to the following figures.

DETAILED DESCRIPTION

Introduction

The presence of multiple types of wireless interfaces (that are capable of performing wireless communications according to different wireless technologies) in a user equipment (UE) can result in interference between the different wireless interfaces. In some implementations, the different wireless interfaces may operate concurrently in adjacent or overlapping radio frequency (RF) bands. In the ensuing discussion, a wireless interface that communicates in an RF band is also referred to as a radio interface. Note that although reference is made to radio interfaces in the ensuing discussion, it is noted that techniques or mechanisms can also be applied to other types of wireless interfaces, such as interfaces that communicate at frequencies outside the RF bands, interfaces that communicate optically (e.g. infrared interfaces), interfaces that communicate using acoustic signaling, and so forth.

If multiple radio interfaces in a UE are able to operate concurrently in adjacent or overlapping frequency bands, then signal transmission in a first frequency band by one radio interface in the UE can interfere with signal reception in a second frequency band by another radio interface in the same UE, particularly where the radio interfaces are in relatively close proximity to each other in the UE. Such interference can be referred to as in-device coexistence (IDC) interference. In some examples, IDC interference can occur between a radio interface operating according to the Long Term Evolution (LTE) technology and another radio interface operating according to the Industrial, Scientific and Medical (ISM) technology.

The LTE technology is defined by LTE standards provided by the Third Generation Partnership Project (3GPP). The LTE standards include the initial LTE standards or the LTE-Advanced standards. The LTE standards are also referred to as the Evolved Universal Terrestrial Radio Access (EUTRA) standards.

The frequency band for the ISM technology is reserved for use of certain types of communications, such as Bluetooth communications, WiFi communications, and so forth. The ISM technology is defined by the International Telecommunication Union (ITU).

IDC interference can also exist between an LTE radio interface and another radio interface that performs Global Navigation Satellite Systems (GNSS) communications. An example of a radio interface that performs GNSS communications is a radio interface in a Global Positioning System (GPS) receiver.

Although reference is made to IDC interference between specific example radio interfaces, it is noted that techniques or mechanisms according to some implementations are applicable to address IDC interference between other types of wireless technologies.

In-Device Coexistence (IDC) Interference Handling Mechanism

Figure 1:
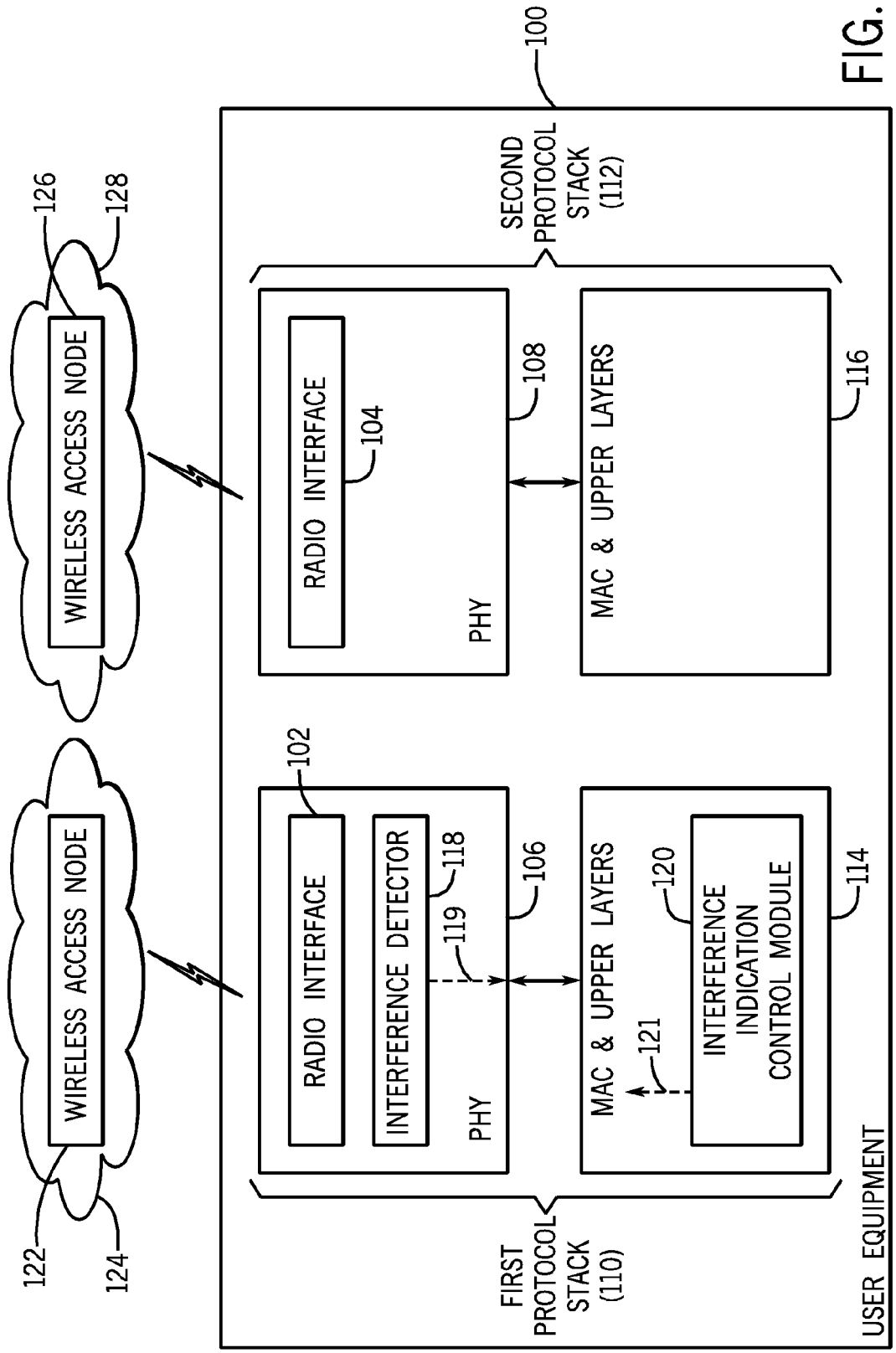
FIG. 1 is a block diagram of an example arrangement that includes a user equipment and wireless access nodes, in accordance with some implementations.

FIG. 1 is a block diagram of an example arrangement that includes a UE 100, which can be a mobile telephone, a smartphone, a personal digital assistant (PDA), a tablet computer, a notebook computer, or any other type of electronic device that is capable of performing wireless communications. In the example of FIG. 1, the UE 100 can include two different types of radio interfaces 102 and 104 that operate according to corresponding different wireless technologies. Although just two radio interfaces 102, 104 are depicted in FIG. 1, it is noted that in alternative examples, there can be more than two different types of radio interfaces in the UE 100.

The radio interface 102 is able to wirelessly communicate with a wireless access node 122 in a wireless access network 124, and the radio interface 104 is able to wirelessly communicate with another wireless access node 126 in a wireless access network 128. Each radio interface 102 or 104 can be a radio transceiver that includes a transmitter to transmit RF signals, and a receiver to receive RF signals.

The radio interfaces 102 and 104 are part of respective protocol stacks 110 and 112. The first and second protocol stacks 110 and 112 form a communication subsystem of the UE 100, to allow the UE 100 to communicate with various external entities.

The first protocol stack 110 can include protocol layers for a first wireless technology, while the second protocol stack 112 can include protocol layers for a second, different wireless technology. As examples, the first protocol stack 110 can operate according to the LTE technology, while the second protocol stack 112 can operate according to the ISM or GNSS technology.

In the foregoing example that includes an LTE protocol stack 110, the wireless access node 122 can be an evolved node B (eNB) according to the LTE technology. An eNB can include functionalities of a base station and a radio network controller.

If the second protocol stack 112 operates according to the ISM technology, then the wireless access node 126 in the wireless access network 128 can be a WiFi wireless access point, a Bluetooth master device, or some other type of wireless access point or base station. On the other hand, if the second protocol stack 112 operates according to the GNSS technology, then the wireless access node 126 can be a satellite.

In the ensuing discussion, it is assumed that the first protocol stack 110 is an LTE protocol stack, and the wireless access node 122 is an eNB. However, it is noted that techniques or mechanisms according to some implementations can be applied to other wireless technologies.

The LTE protocol stack 110 includes a physical layer 106 (that includes the radio interface 102) and higher layers 114 that include a medium access control (MAC) layer and upper layers. The physical layer 106 can be considered the lowest layer in the first protocol stack 110. The second protocol stack 112 includes a physical layer 108 (that includes the radio interface 104) and higher layers 116 that include a MAC layer and upper layers.

Generally, a MAC layer can provide addressing and channel access control mechanisms to allow the UE 100 to communicate over a shared medium, in this case a shared wireless medium. In some implementations, the upper layers of the LTE protocol stack 110 can include a Radio Resource Control (RRC) layer, as described in 3GPP Technical Specification (TS) TS 36.331. The upper layers can further include other protocol layers. The RRC protocol can define functionality associated with assignment, configuration, and release of radio resources between the UE 100 and the eNB 122. Although reference is made to an RRC layer in the discussed examples, it is noted that in other examples, the upper layers can include alternative upper layers.

The upper layers that are included in the second protocol stack 112 depend on the wireless technology implemented by the second protocol stack 112.

As depicted in FIG. 1, the physical layer 106 further includes an interference detector 118. The interference detector 118 is able to detect IDC interference, such as IDC interference at a receiver of the radio interface 102 caused by transmission by a transmitter in the radio interface 104. In some examples, the interference detector 118 may also be able to detect IDC interference at a receiver of the radio interface 104 caused by transmission by a transmitter of the radio interface 102. In yet further examples, another interference detector (not shown) may also be provided in the physical layer 108 of the second protocol stack 112 to detect IDC interference at the receiver of the radio interface 104 caused by transmission by the transmitter of the radio interface 102.

Various techniques can be used for detecting IDC interference in a UE. Examples of several techniques are described in U.S. application Ser. No. 13/069,751, entitled "Method and Apparatus for Interference Identification on Configuration of LTE and BT," filed Mar. 23, 2011.

In some examples, detection of IDC interference can be based on measurements at a radio receiver in the presence of transmissions from a radio transmitter. In alternative implementations, rather than performing detection of IDC interference based on measurements, IDC interference detection by the interference detector 118 can instead be based on internal coordination between the radio interfaces of the UE 100.

There can be various operation modes at the UE 100 that can be used to perform IDC interference avoidance or reduction. For example, according to 3GPP TR 36.816, the possible operation modes include an uncoordinated mode, a coordinated within UE only mode, and a coordinated within UE and with network mode. Internal coordination between radio interfaces is possible in the coordinated within UE only mode and the coordinated within UE and with network mode.

In the uncoordinated mode, the different radio interfaces within the same UE operate independently without any internal coordination with each other. However, in the coordinated within UE only mode or coordinated within UE and with network mode, there can be internal coordination between the different radio interfaces within the same UE, such that at least the activities of one radio interface is known by the other radio interface. Such coordination allows one radio interface to become aware of presence of IDC interference.

Upon detecting IDC interference, the interference detector 118 can activate an interference notification 119 that is provided to an interference indication control module 120. The interference indication control module 120 can be provided in one of the higher layers 114. In alternative examples, the interference indication control module 120 can also be provided in the physical layer 106.

The interference indication control module 120 can respond to the interference notification 119 from the interference detector 118 by generating an IDC indication 121 that is to be transmitted from the UE 100 to a corresponding wireless access node, such as the eNB 122. Generally, an "IDC indication" includes any information that relates to the IDC interference, which can be provided in any of various possible messages that can be sent from the UE 100 to the corresponding wireless access node. As discussed below, the IDC indication can include assistant information that is useable by the eNB 122 to decide which solution is to be applied by the UE 100 to mitigate the IDC interference.

As discussed further below, a prohibit mechanism is provided for the interference indication control module 120 to determine whether or not an IDC indication is to be transmitted by the UE 100 in response to detection of IDC interference. This prohibit mechanism can include a prohibit counter in some implementations. In alternative implementations, the prohibit mechanism can include both a prohibit counter and a prohibit timer (discussed further below). Additionally, in some implementations, the interference indication control module 120 is able to implement techniques to achieve reduced signaling overhead associated with IDC operations.

In this discussion, although reference is made to the LTE protocol stack 110 sending an IDC indication to the eNB 122, it is noted that in other implementations, the second protocol stack 112 can also include a mechanism to detect IDC interference and to send an IDC indication to the corresponding wireless access node 126. Moreover, although reference is made to specific indications, messages, and procedures that may be according to the LTE technology, it is noted that in alternative implementations, techniques or mechanisms as discussed can be applied also to other technologies for handling of IDC interference between radio interfaces of a UE.

An issue associated with transmissions of IDC indications is that different UEs may use different triggering conditions and parameters for triggering transmissions of IDC indications. For example, different UEs can use different interference thresholds for triggering transmissions of IDC indications. A first UE can cause an IDC indication to be transmitted when a detected interference exceeds a first threshold, while a second UE can cause an IDC indication to be sent in response to interference exceeding a second, different threshold.

It is noted that a lower interference threshold would cause potentially a larger number of IDC indications to be sent by a particular UE. As a result, if uncontrolled, some UEs may transmit a relatively larger number of IDC indications than other UEs within a coverage area of a particular wireless access node. This can cause unfairness among the UEs with respect to IDC indication transmission. The UEs that use lower interference thresholds may have more opportunity to send IDC indications to the wireless access node than other UEs that use a higher interference threshold. Additionally, use of a lower interference threshold can result in a larger volume of IDC indications, which can create additional signaling overhead and burden on the wireless access node when scheduling communications with UEs within a particular coverage area of the wireless access node.

In some examples, to control the frequency of transmissions of IDC indications, a prohibit timer can be employed. The prohibit timer can be used to define a minimum time interval between successive transmissions of IDC indications. Examples of prohibit timers include an sr-Prohibit-Timer or an prohibitPHR-Timer, as described in 3GPP TS 36.321 or TS 36.331.

Use of prohibit timers to define wait intervals between transmissions of successive IDC indications may result in reduced performance in some example scenarios. One example scenario involves the transmission of dynamically fluctuating traffic, such as variable bit rate (VBR) traffic, by a UE. With VBR traffic, the data bit rate and amount of traffic can dynamically fluctuate over time. Dynamic fluctuations in data being transmitted by a radio interface can cause different levels of interference at different times.

Figure 2:
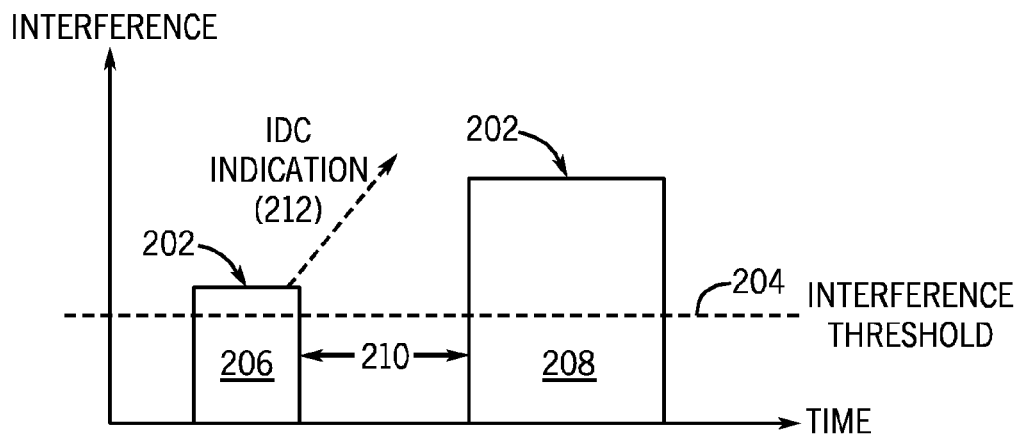
FIG. 2 is a timing diagram illustrating interference caused by dynamically fluctuating traffic.

FIG. 2 is a timing diagram that illustrates IDC interference at a receiver of the radio interface 102 of FIG. 1 (e.g. an LTE receiver) due to transmission of signals by a transmitter of the radio interface 104 (e.g. a WiFi transmitter). The vertical axis in the graph of FIG. 2 represents IDC interference at the LTE receiver, and the horizontal axis represents time. A time-varying waveform 202 represents interference caused by a dynamically fluctuating traffic pattern of the WiFi transmitter. A horizontal dashed line 204 represents an interference threshold. If the IDC interference at the LTE receiver is detected to exceed the interference threshold 204, then an IDC indication can be triggered.

A first block 206 of the waveform 202 represents the magnitude and duration of IDC interference caused by first transmitted traffic from the WiFi transmitter, while a second block 208 represents the magnitude and duration of IDC interference caused by second transmitted traffic from the WiFi transmitter. A time gap 210 between the blocks 206 and 208 represents a time interval during which the interference at the LTE receiver is less than the interference threshold 204.

In the example of FIG. 2, the IDC interference represented by the block 206 causes an IDC indication (212) to be transmitted by the UE 100. The transmission of the IDC indication 212 can trigger the start of a prohibit timer. If the IDC interference represented by the second block 208 occurs before expiration of the prohibit timer, then transmission of an IDC indication corresponding to the interference of the second block 208 is prohibited. This can cause the eNB 122 to miss the interference represented by the second block 208, which in the example of FIG. 2 is a substantially higher interference than the interference represented by the first block 202. As a result, in some cases, use of the prohibit timer may suppress an IDC indication in a situation where an IDC indication would be beneficial for handling IDC interference. Additionally, an IDC indication may be transmitted due to interference that is relatively low (but still above the interference threshold 204), which may lead to suppression of an IDC indication for a subsequent IDC interference that is much higher than the first interference. As a result, use of the prohibit timer by itself may lead to sub-optimal handling of IDC interference in the presence of dynamically fluctuating traffic, such as VBR traffic. Without timely reporting of instances of IDC interference at the UE 100, data communication performance may suffer.

Also, quality-of-service (QoS) goals may be violated if timely reporting of IDC indications does not occur.

Figure 3:
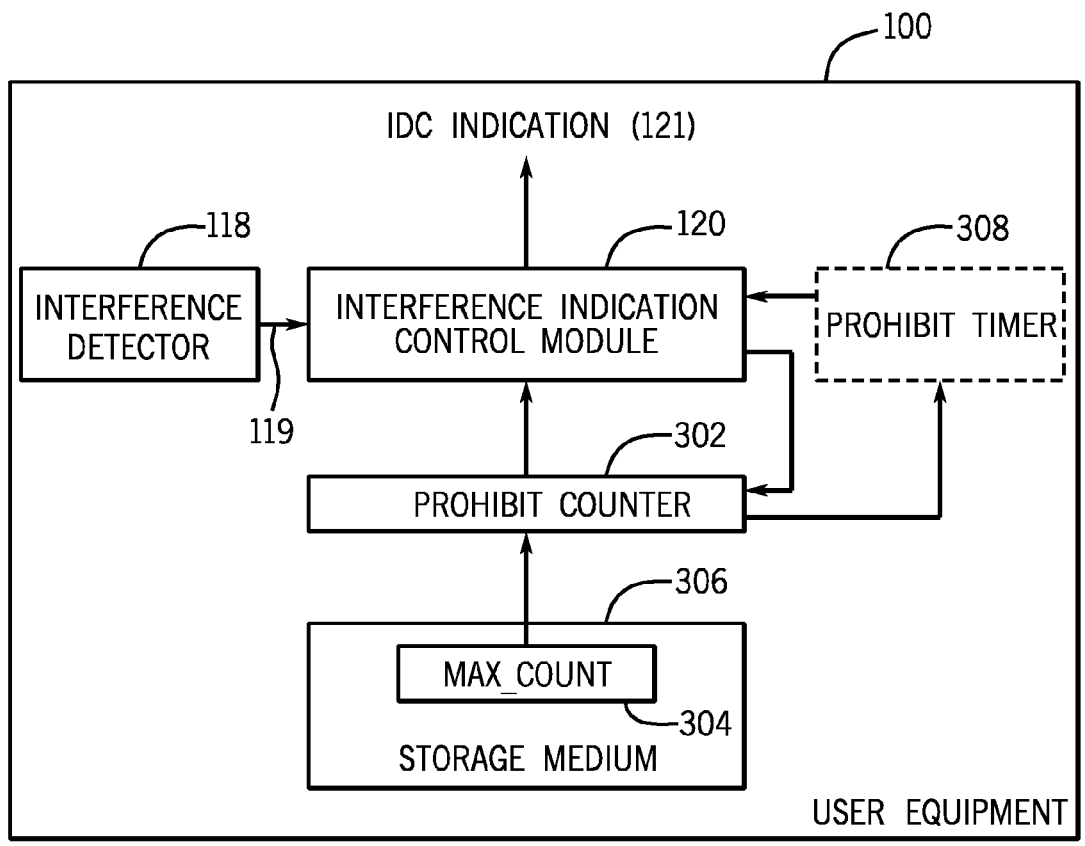
FIG. 3 is a block diagram of components in a user equipment for handling in-device coexistence (IDC) interference, according to some implementations.

FIG. 3 depicts components involved in generating an IDC indication 121, in accordance with some implementations. A prohibit mechanism according to some implementations includes a prohibit counter 302, which is used to track a number of transmissions (by the UE 100) containing the IDC indication 121. In some implementations, the prohibit mechanism can also include a prohibit timer 308, such as the sr-ProhibitTimer or prohibitPHR-Timer noted above. In other examples, another type of prohibit timer can be employed. In alternative examples, the prohibit mechanism does not use the prohibit timer 308.

Each transmission containing the IDC indication 121 (that is responsive to detection of IDC interference at the UE 100) causes the prohibit counter 302 to advance (e.g. increment or decrement) by a predefined value (e.g. one or some other value). In some examples, the prohibit counter 302 increments with each transmission containing the IDC indication 121. In such examples, the prohibit counter 302 can be initialized to an initial value (e.g. zero), and can increment up to a target value, as represented by a parameter MAX_COUNT 304 stored in a storage medium 306.

In other examples, the prohibit counter 302 can decrement with each transmission containing the IDC indication 121. In such examples, the prohibit counter can be initialized to the MAX_COUNT value, and can decrement down to a target value (e.g. zero).

So long as the prohibit counter 302 has not advanced to its target value (MAX_COUNT value or zero, depending upon whether the prohibit counter 302 is configured to increment or decrement with each transmission of the IDC indication 121), the interference indication control module 120 is allowed to transmit the IDC indication 121 if an interference notification 119 is received from the interference detector 118 to indicate detection of IDC interference.

When the prohibit counter 302 reaches its target value (e.g. MAX_COUNT value or zero, depending upon whether the prohibit counter 302 is configured to increment or decrement with each transmission containing the IDC indication 121), the prohibit counter 302 is considered to have expired. Upon expiration of the prohibit counter 302, the interference indication control module 120 is prohibited from transmitting another IDC indication 121 in response to interference detected by the interference detector 118.

The value of the parameter MAX_COUNT 304 can be set as a system parameter for the UE 100, in which case the value of the parameter MAX_COUNT 304 is preconfigured in the UE 100. Allocation of the parameter MAX_COUNT 304 as a system parameter does not involve the eNB 122 in setting the value of the parameter MAX_COUNT 304.

In other examples, the value of the parameter MAX_COUNT 304 can be communicated from the eNB 122, in a particular message. In such examples, the eNB 122 can set the value of MAX_COUNT without any input or suggestion from the UE 100. In alternative examples, the UE 100 can suggest a value for MAX_COUNT, which can be accepted or rejected by the eNB 122 in setting the value of MAX_COUNT. If the eNB 122 rejects the suggested MAX_COUNT value from the UE 100, the eNB 122 can instead substitute a MAX_COUNT value set based on one or more factors. The eNB 122 can send a MAX_COUNT value to the UE 100 at the request of the UE 100, or alternatively, in response to an event at the eNB 122.

Figure 4:
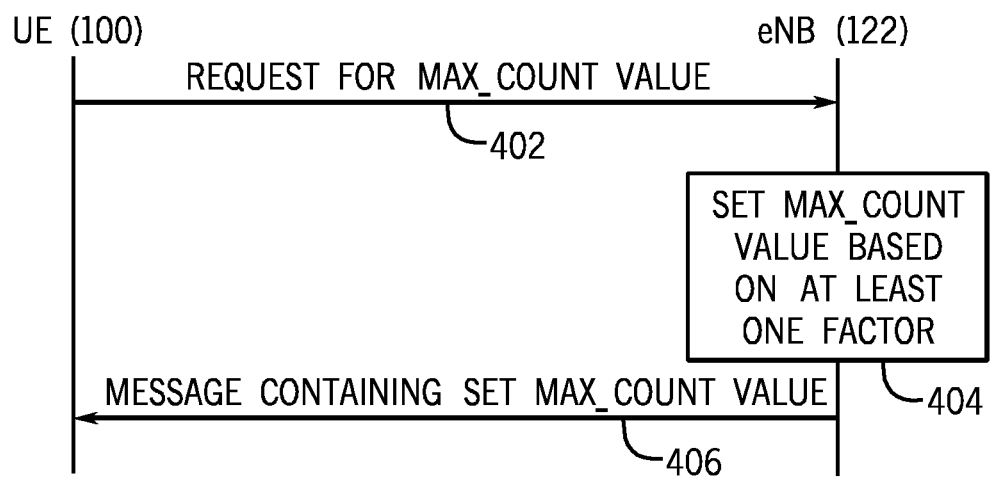
FIG. 4 is a message flow diagram of a process for setting a maximum count value for a prohibit counter, in accordance with some implementations.

FIG. 4 is a message flow diagram of signaling exchanged between the UE 100 and the eNB 122. In some examples, the UE 100 can send (at 402) a request for a new MAX_COUNT value. The conditions under which the UE 100 can send a request for a new MAX_COUNT value is discussed below in connection with FIG. 5. The request sent at 402 can include a suggested MAX_COUNT value, in some examples. In other examples, the UE 100 does not suggest a MAX_COUNT value.

The eNB 122, in response to the request, sets (at 404) the MAX_COUNT value based on at least one factor. In some cases, the eNB 122 can accept the suggested MAX_COUNT value if provided by the UE 100. Alternatively, the eNB 122 can reject the suggested MAX_COUNT value from the UE 100, and set the MAX_COUNT value to a different value based on the at least one factor, including the traffic load of a coverage area of the eNB 122, a configuration set by the service provider of the eNB 122, and so forth.

Note that the eNB 122 does not actually have to wait for the UE 100 to send a request for a new MAX_COUNT value before the eNB 122 produces a new MAX_COUNT value for transmission to the UE 100. In other examples, the eNB 122 can decide to set a new MAX_COUNT value as part of a scheduling procedure performed by the eNB 122, a load balancing procedure performed by the eNB 122, or other events.

Another condition that can cause the eNB 122 to generate a MAX_COUNT value is part of a synchronization procedure. Each IDC indication sent by the UE 100 to the eNB 122 can contain a current count of the prohibit counter 302 (FIG. 3), which tracks the number of IDC indications sent by the UE 100. In some implementations, the eNB 122 can also include a counter that is analogous to the prohibit counter 302, to track a number of receipts of the IDC indication from the UE 100. Upon receiving an IDC indication from the UE 100, the eNB 122 can advance its counter. The eNB 122 can then compare the current count value received in the IDC indication with the count value in the eNB counter. If a mismatch between the count values is detected, then a synchronization procedure is triggered at the eNB 122, which causes the eNB 122 to send a MAX_COUNT value to the UE 100.

The eNB 122 sends (at 406) a message that contains the MAX_COUNT value (set by the eNB 122) to the UE 100. In some examples, the message sent at 406 can include:
a new RRC message,
an existing RRC message with a new information element,
an IDC response message (which is a response to an IDC indication from the UE 100),
a new MAC Control Element or a reserved field in an existing MAC Control Element, or
any other message.

Receipt of the MAX_COUNT value from the eNB 122 causes the UE 100 to store the received MAX_COUNT value in the storage medium 306 (FIG. 3) of the UE 100, and to reset the prohibit counter 302.

Figure 5:
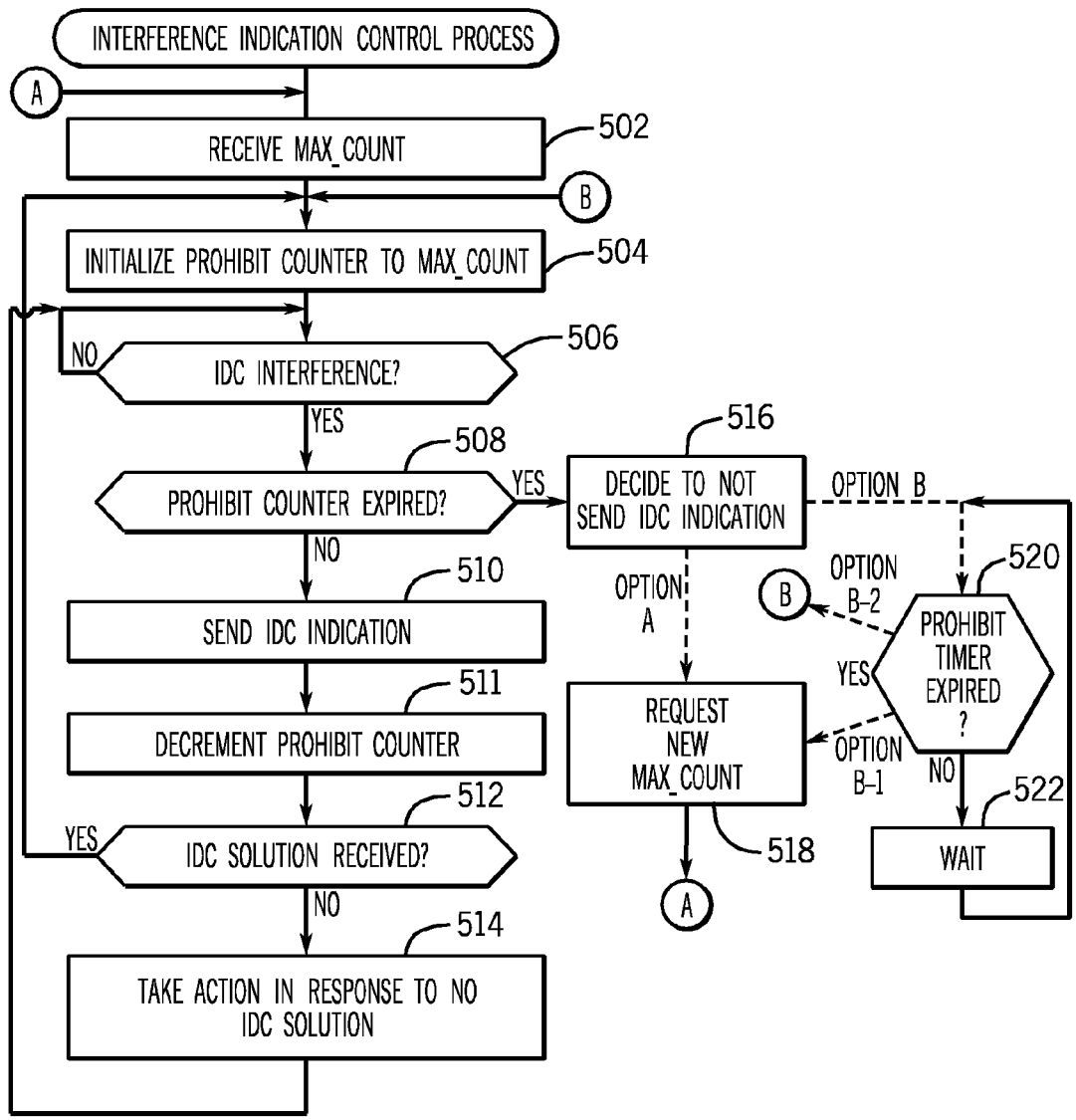
FIG. 5 is a flow diagram of an interference indication control process, in accordance with some implementations.

FIG. 5 is a flow diagram of an interference indication control process according to some implementations. The process of FIG. 4 can be performed by the UE 100. The FIG. 5 process assumes a configuration of the prohibit counter 302 that is initialized to the MAX_COUNT value and is decremented with each transmission containing an IDC indication. Note that a similar flow can be provided for the alternative configuration of the prohibit counter 302 that is initialized to zero and increments with each transmission containing an IDC indication up to the MAX_COUNT value.

The interference indication control module 120 in the UE 100 receives (at 502) the parameter MAX_COUNT. This receiving can involve retrieving the value of the parameter MAX_COUNT 304 (FIG. 3) from the storage medium 306 in the UE 100. As noted above, the parameter MAX_COUNT 304 can be a system parameter that is preconfigured at the UE 100 without eNB involvement. Alternatively, the parameter MAX_COUNT 304 can be set by the eNB 122 (with or without suggestion by the UE 100) and communicated to the UE 100.

The interference indication control module 120 initializes (at 504) the prohibit counter 302 to the MAX_COUNT value.

The interference indication control module 120 determines if IDC interference is detected (at 506), as indicated by the interference detector 118. If not, the interference indication control module 120 continues to wait for detection of IDC interference. If IDC interference is detected (at 506), the interference indication control module 120 determines (at 508) whether the prohibit counter 302 has expired (the prohibit counter 302 has decremented to zero). If the prohibit counter 302 has not expired, the interference indication control module 120 sends (at 510) an IDC indication in response to the detection of IDC interference.

Upon sending the IDC indication (at 510), the interference indication control module 120 decrements (at 511) the prohibit counter 302. Decrementing the prohibit counter 302 can be triggered when the IDC indication is transmitted by the MAC layer, or alternatively, when the IDC indication is transmitted by the physical layer 106.

The interference indication control module 120 next determines (at 512) whether an IDC solution has been received from the eNB 122 in response to the IDC indication sent at 510. If so, the IDC solution can be applied by the UE 100. The IDC solution applied by the UE 100 causes the UE to modify its wireless communication behavior to mitigate the IDC interference. Various IDC solutions are discussed further below.

Next, the process of FIG. 5 proceeds back to task 504, where the prohibit counter 302 is initialized to the MAX_COUNT value. This causes a reset of the prohibit counter 302.

On the other hand, if the IDC solution is not received (as determined at 512), then the interference indication control module 120 can take (at 514) a corresponding action, such as any of the following. The failure to receive the IDC solution can be the result of an express rejection, by the eNB 122, of an IDC indication that was sent by the UE 100 to the eNB 122. In this scenario, the prohibit counter 302 is decremented. In another scenario, the UE 100 may not have received any response to the IDC indication (the UE 100 does not receive either an IDC solution or a rejection of the IDC indication from the eNB 122). In this latter scenario, the action taken at 514 can include decrementing the prohibit counter 302 or deciding not to decrement the prohibit counter 302. The process of FIG. 5 next proceeds to task 506 to determine whether a further instance of IDC interference is detected.

The expiration of the prohibit counter 302 (as detected at 508) can trigger any of various actions by the interference indication control module 120 depending upon how the interference indication control module 120 is configured. Expiration of the prohibit counter 302 causes the interference indication control module 120 to decide (at 516) to not send an IDC indication even though IDC interference is detected. Next, the interference indication control module 120 can take one of two actions represented as option A and option B in FIG. 5. According to option A, the interference indication control module 120 can request (at 518), from the eNB 122, a new MAX_COUNT value. This request can be sent in any of various messages, such as an RRC message (which can be a new RRC message or an existing RRC message that has a new information element for the request), a MAC Control Element (which can be a new MAC Control Element or a reserved field of an existing MAC Control Element), and so forth. From task 518, the process of FIG. 5 returns to task 502 to receive the Max_Count value, which in this case would be returned by the eNB 122 in response to the request submitted at 518.

Alternatively, if the configuration is according to option B, the interference indication control module 120 also considers the value of the prohibit timer 308 (FIG. 3). The prohibit timer 308 can be triggered to start upon expiration of the prohibit counter 302. The interference indication control module 120 determines (at 520) whether the prohibit timer 308 has expired (has progressed to a specified target value after starting of the prohibit timer 308). If the prohibit timer 308 has not yet expired, the interference indication control module 120 continues to wait (at 522) for expiration of the prohibit timer 308.

On the other hand, if the prohibit timer 308 has expired, then the interference indication control module 120 can take one of two actions corresponding to option B-1 or option B-2. According to option B-1, the interference indication control module 120 can request (at 518) a new MAX_COUNT value from the eNB 122 to cause reset of the prohibit counter 302. According to option B-2, on the other hand, the interference indication control module 120 causes reset of the prohibit counter 302 by initializing (at 504) the prohibit counter to the MAX_COUNT value currently stored in the storage medium 306 (FIG. 3) of the UE 100.

In further alternative examples, instead of waiting for the expiration of the prohibit counter 302 to trigger the request of a new MAX_COUNT value, the interference indication control module 120 can instead request the new MAX_COUNT value upon the prohibit counter 302 reaching a specified trigger value prior to expiration of the prohibit counter 302. The specified trigger value can be the value "1" for example. Upon the prohibit counter 302 reaching the specified trigger value, the interference indication control module 120 sends a request to the eNB 122 for a new MAX_COUNT value. This request can be provided as an information element in the next transmitted IDC indication. Alternatively, this request can be in a new RRC signaling message or a new information element of an existing RRC signaling message. As yet further examples, the request can be in a new MAC Control Element or a reserved field of an existing MAC Control Element. In other examples, the request can be provided in another type of message.

In the configurations where the prohibit counter 302 is initialized to zero and is incremented with each transmission containing an IDC indication until the prohibit counter 302 expires upon reaches the MAX_COUNT value, the process of FIG. 5 is modified in the following manner, in some examples: task 504 is modified to initialize the prohibit counter 302 to zero; task 508 is modified to detect expiration of the prohibit counter 302 when it reaches the MAX_COUNT value; and task 511 is modified to increment the prohibit counter 302.

By using prohibit mechanisms according to some implementations that include the prohibit counter 302, improved IDC interference can be achieved. More timely transmissions of IDC indications can be achieved, particularly in the presence of dynamically fluctuating traffic, such as VBR traffic, for example. Also, use of the prohibit counter 302 allows for the amount of IDC indications transmitted by a UE to be controlled, to avoid substantial imbalance in the number of IDC indications transmitted by different UEs.

As noted above, the eNB 122 can send an IDC solution to the UE 100 in response to an IDC indication from the UE 100. The IDC solution causes the UE 100 to modify its wireless communication behavior to remove or reduce the IDC interference. In some examples, the eNB 122 can select one of several IDC solutions to allocate to the UE 100 in response to an IDC indication. As examples, the IDC solutions can include a Frequency Division Multiplexing (FDM) solution or a Time Division Multiplexing (TDM) solution. As other examples, the IDC solutions can further include a power control solution.

An FDM solution generally involves modifying the communication frequency of a particular radio interface in the UE 100 to cause frequency separation between transmissions at a first radio interface and receptions at a second radio interface. Modifying the communication frequency of the particular radio interface can be accomplished by performing handover of a communications session of the particular radio interface from a first radio carrier (at a first frequency) to a second radio carrier (at a second, different frequency).

In some examples, to implement the FDM solution, the UE 100 can inform the eNB 122 when transmission/reception of LTE or other radio signals would benefit or no longer benefit from LTE radio interface 102 not using certain carriers or frequency resources. With this approach, UE 100 indicates which frequency or frequencies are (or are not) useable due to IDC interference. The indication of which frequency or frequencies are (or are not) useable can be communicated in an IDC indication sent by the UE 100. The IDC indication sent by the UE 100 to the eNB 122 can also include various frequency measurement information (discussed further below) that can also be used by the eNB 122 to decide on the FDM solution to use.

A TDM solution generally involves modifying a time pattern associated with communication of a particular radio interface in the UE 100 to cause time separation between transmissions at a first radio interface and receptions at a second radio interface. There can be several types of TDM solutions, including, as examples, the following: a TDM-DRX (Discontinuous Reception) solution, a TDM-HARQ (Hybrid Automatic Repeat Request) solution, and a TDM-gap solution.

With a TDM solution, the UE 100 can send information regarding the IDC interference in an IDC indication, where the information can include the following example information: interferer type, mode, and appropriate offset in subframes. Based on the information, the eNB can configure a TDM pattern for the TDM solution, where the TDM pattern specifies scheduling and unscheduled periods for communication of the UE 100. In some examples, the UE 100 can suggest a TDM pattern in the IDC indication. In response to the suggested TDM pattern from the UE 100, the eNB 122 can decide on the final TDM pattern to use.

With a TDM-DRX solution, the UE 100 can provide the eNB 122 with a desired TDM pattern. For example, the parameters related to the TDM pattern can include the following: (1) the periodicity of the TDM pattern, and (2) the scheduling period (or unscheduled period). It is up to the eNB 122 to decide and signal the final DRX configuration to the UE 100 based on the UE suggested TDM pattern and other possible criteria (e.g. traffic type). The scheduling period corresponds to the active time of DRX operation, while unscheduled period corresponds to the inactive time.

With a TDM-HARQ solution, a number of LTE HARQ processes are reserved for LTE operation, and the remaining subframes are used to accommodate non-LTE (e.g. ISM or GNSS) traffic.

With the TDM-gap solution, the "gap" refers to a period during which the UE 100 can perform measurements to obtain frequency measurement information (discussed further below) relating to the LTE radio interface 102. During each such gap, no uplink or downlink transmissions are scheduled. During the gap, the non-LTE radio interface 104 can transmit and receive data.

A power control solution can be used to reduce power reduction at the UE 100 to mitigate IDC interference. In some examples, the UE 100 can report to the eNB 122 that power reduction is desired. In response, the eNB 122 can adjust the UE transmission power at one or more of the radio interfaces in the eNB 122.

Although various IDC solutions are described above, it is noted that other IDC solutions can be used in other implementations.

Interference Signaling Procedures

According to a 3GPP Specification that describes IDC operations, an eNB is able to indicate, to a UE, whether or not the eNB supports an IDC solution. If the eNB indicates that it does not support an IDC solution, then a UE does not send an IDC indication to the eNB, to reduce signaling overhead associated with transmission of IDC indications. However, if the eNB indicates that it does support an IDC solution, then a UE can send an IDC indication to the eNB upon detection of IDC interference at the UE. In some examples, the IDC indication that is sent by the UE contains both FDM solution and TDM solution assistant information, so that the eNB is able to allocate either a FDM solution or a TDM solution to the UE. The assistant information included in the IDC indication can include the various information discussed above in connection with several IDC solutions (e.g. time pattern information, frequency measurement information, etc.).

The eNB may support both the FDM solution and TDM solution. The eNB supporting a particular IDC solution refers to the eNB being able to allocate the particular IDC solution to a UE, in the form of information that allows the UE to modify its wireless communication behavior to mitigate IDC interference. However, in some cases, the eNB may support just a FDM solution or just a TDM solution. As examples, an eNB may not support the FDM solution if the eNB uses a single frequency band or a relatively small number of frequency bands. As further examples, an eNB may not be able to allocate a TDM solution due to loading or scheduling restriction at the eNB.

In situations where the eNB supports does not support both an FDM solution and a TDM solution, sending assistant information in an IDC indication regarding both FDM and TDM solutions can lead to wasted signaling burden and overhead.

In accordance with some implementations, to allow for signaling overhead reduction for IDC operation, techniques or mechanisms according to some implementations allow the eNB to indicate which specific IDC solution(s) is supported by the eNB. This can be specified in a capability indication that is sent by the eNB to a UE. The capability indication is settable to various different values to indicate support for corresponding different IDC solutions, including the following: FDM solution only, TDM solution only (and more specifically, a particular type of TDM solution, such as TDM-DRX, TDM-HARQ, and TDM-gap), power control solution only, or a combination of multiple IDC solutions.

As examples, if the capability indication indicates that the eNB supports just the FDM solution, then the UE would send an IDC indication with just FDM-related assistant information (without TDM-related assistant information or power-control related assistant information). On the other hand, if the capability indication indicates that the eNB supports just the TDM solution, then the UE would send an IDC indication that contains just TDM-related assistant information (without FDM-related assistant information or power-control assistant information). On the other hand, if the capability indication indicates that the eNB supports multiple IDC solutions, then the UE can send an IDC indication that contains corresponding assistant information for the supported IDC solutions. By reporting the capability of the eNB to the UE regarding IDC operation, and allowing the UE to selectively send assistant information for the supported IDC solution(s), signaling overhead associated with IDC operation can be reduced.

In alternative examples, a UE may send an indication with just TDM-related assistant information even when the capability indication sent by the eNB indicates support for both FDM and TDM solutions. Omitting the FDM-related assistant information in an IDC indication allows for signaling overhead reduction. Should the eNB decide that an FDM solution may be applied in response to an IDC indication from a UE, then the eNB can request further information regarding FDM-related assistant information from the UE. This alternative mechanism results in the UE communicating FDM-related assistant information only when the eNB decides that an FDM solution may be applied.

Note that if the eNB supports only a first IDC solution, but the UE supports only a second IDC solution, then the UE would not send an IDC indication in response to detection of IDC interference. For example, if the eNB supports only a TDM solution but the UE supports only an FDM solution, then the UE would not send an IDC indication in response to IDC interference detection. More generally, if the eNB supports an IDC solution that differs from the IDC solution supported by the UE, then the UE would not send an IDC indication in response to IDC interference detection at the UE.

Figure 6:
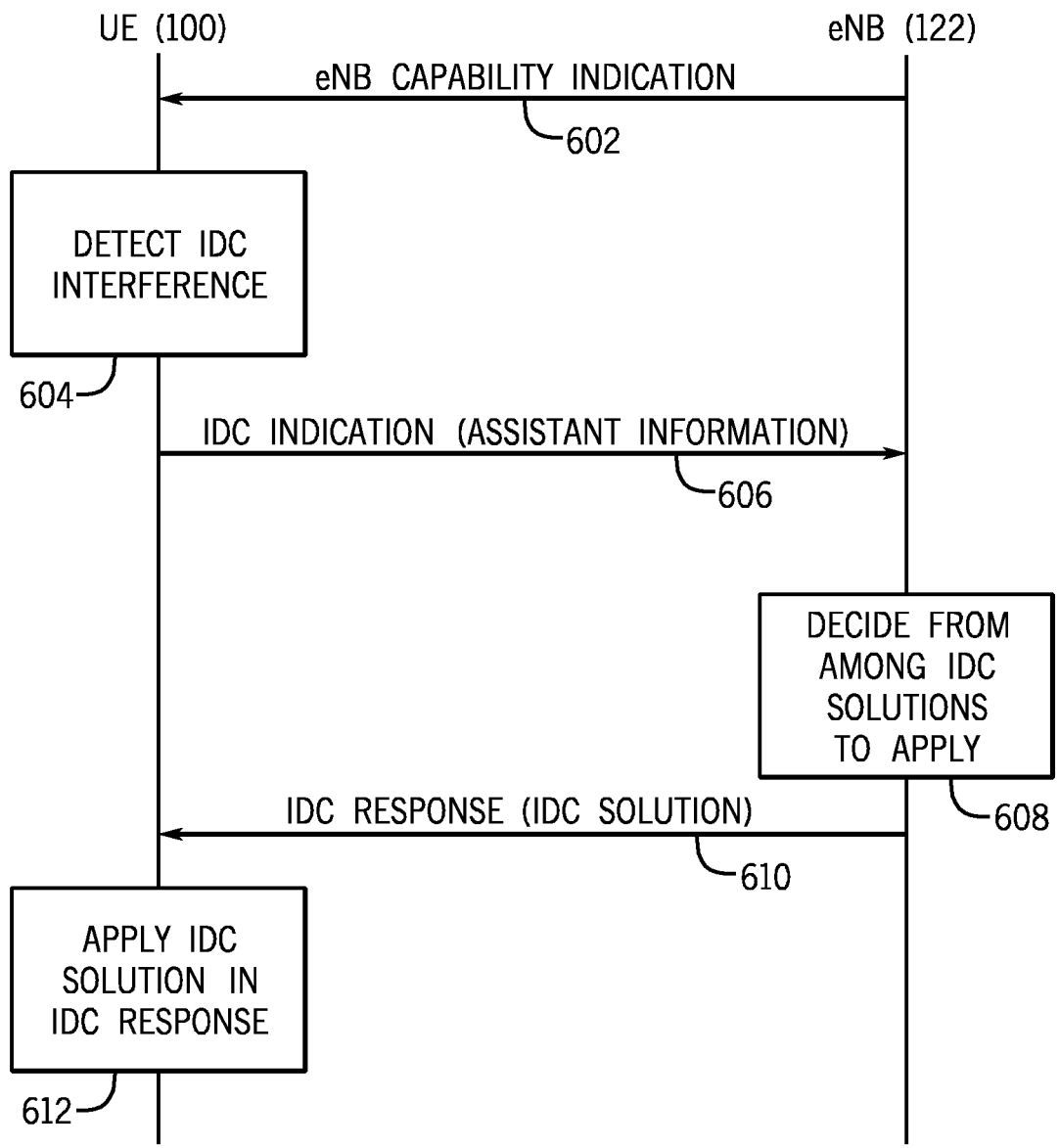
FIGS. 6 and 7 are message flow diagrams of processes of reducing signaling overhead for IDC operation, in accordance with various implementations.

FIG. 6 is a message flow diagram of signaling between the UE 100 and the eNB 122, according to some implementations. The eNB 122 sends (at 602) an eNB capability indication. The eNB capability indication specifies whether the eNB supports a TDM solution or an FDM solution, or both TDM and FDM solutions. The table below depicts example information elements that can be provided in the eNB capability indication that is sent at 602. Note that in other examples, other formats and contents are possible.

| Supportable Solutions | Bits for detail level | Bits for simple level |
|---|---|---|
| FDM | 000 | 00 |
| TDM-DRX | 001 | 01 |
| TDM-HARQ | 010 | |
| TDM-gap | 011 | |
| Both | 100 | 10 |
| Reserved | 101-111 | 11 |

The first column of the table above identifies the IDC solutions that are supportable by the eNB. The second column depicts an information element implemented with three bits. Different values of this 3-bit information element can specify support for different respective IDC solutions. For example, a value "000" indicates support for the FDM solution, a value "001" indicates support for the TDM-DRX solution, a value of "010" indicates support for the TDM-HARQ solution, a value "011" indicates support for the TDM-gap solution, a value "100" indicates support for both FDM and TDM solutions, and values "101-111" are reserved.

The third column of the table above depicts an alternative implementation in which the information element of the eNB capability indication is implemented with two bits.

In different examples, different values of the information elements can be used for indicating support for different IDC solutions. Moreover, although a power control solution is not listed as a possible IDC solution in the table above, it is noted that in other examples, another value of the information element in the eNB capability indication can specify support for the power control solution, or for any other IDC solution. To add support for another IDC solution in the table above, one of the reserved values of the information element can be used to indicate support for this other IDC solution.

Note that the eNB can dynamically indicate different solutions over time based on the eNB's capability. In fact, the eNB may be able to change the indication of the IDC solution supported during an IDC event, since available frequencies for FDM and TDM solutions are based on conditions (e.g. cell load status, scheduling restrictions, etc.) of the eNB, which can change.

The eNB capability indication can be transmitted on a dedicated channel, a common channel, or both dedicated and common channels. In some examples, the eNB capability indication can be included in any of the following:
- a new RRC message,
- a new information element in an existing RRC message,
- an IDC response message (that is responsive to an IDC indication), or
- a new MAC Control Element (CE) or a reserved field in an existing MAC Control Element.

As further depicted in FIG. 6, after the UE 100 has received the eNB capability indication sent at 602, the UE 100 detects (at 604) IDC interference. In response to the IDC interference detection, the UE 100 sends (at 606) an IDC indication to the eNB 122. In accordance with some implementations, the assistant information that is included in the IDC indication depends on the IDC solution(s) indicated as being supported in the eNB's capability indication that was sent at 602.

Upon receiving the IDC indication, the eNB 122 uses the assistant information in the IDC indication to decide (at 608) the IDC solution, from among multiple IDC solutions, to apply. The eNB 122 then sends (at 610) an IDC response (which is responsive to the IDC indication sent at 606) to the UE 100. The IDC response includes the information relating to the IDC solution selected by the eNB 122. Upon receiving the IDC response, the UE 100 applies (at 612) the IDC solution provided by the eNB 122.

In alternative implementations, for further signaling overhead reduction, the UE 100 sends just the TDM assistant information even if the eNB 122 indicates support for both TDM and FDM solutions. As a result, if the eNB 122 decides to allocate an FDM solution, the eNB 122 would have to subsequently request FDM-related assistant information from the UE 100. As examples, the FDM-related assistant information can include frequency measurement information that is based on measurements made by the UE 100. As examples, the UE 100 can measure certain characteristics, such as power of a frequency currently in use (intra-frequency measurements), power on frequencies of a neighboring eNB (inter-frequency measurements), and power on frequencies of other radio access technologies (inter-RAT measurements). These measurements can be used by the eNB to identify which carrier (of a current eNB, of a neighboring eNB, etc.) offers the best radio link quality—this identified carrier can then be used as part of the FDM solution.

Figure 7:
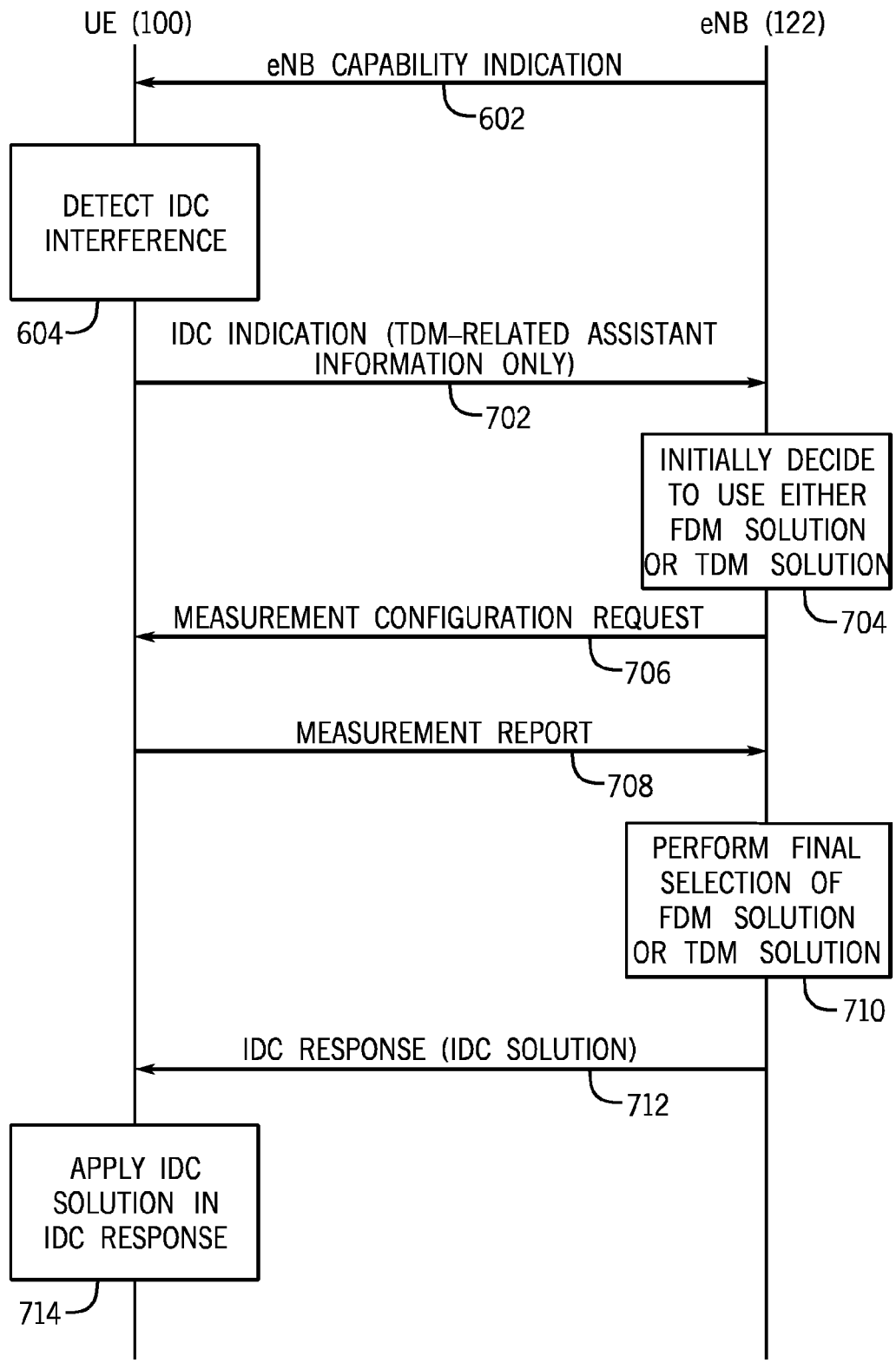

FIG. 7 is a message flow diagram of signaling between the UE 100 and eNB 122, for alternative implementations in which the UE 100 sends just TDM-related assistant information even though the eNB indicates support for both TDM and FDM solutions.

Tasks 602 and 604 in FIG. 7 are similar to tasks 602 and 604 in FIG. 6. It is assumed that the eNB capability indication sent by the eNB at 602 indicates support for both TDM and FDM solutions.

Upon detecting IDC interference (at 604), the UE 100 sends (at 702) an IDC indication that contains just TDM-related assistant information, without FDM-related assistant information. The eNB 122 can initially decide (at 704) to use either the FDM solution or the TDM solution. Although the block 704 is shown as being after task 702, it is noted that the block 704 can be placed above task 702 in other examples.

If the eNB 122 initially decides to use the FDM solution, then the eNB 122 would have to request FDM-related assistant information, since just TDM-related assistant information was included in the IDC indication sent at 702. To request the FDM-related assistant information, the eNB 122 sends (at 706) a measurement configuration request, such as the measurement configuration request specified by 3GPP TS 36.331.

In response to the measurement configuration request, the UE 100 sends (at 708) a measurement report to the eNB 122. The measurement report can include frequency measurement information, such as those noted above.

When the eNB 122 receives the measurement report from the UE 100, the eNB 122 can make its final selection (at 710) of either the FDM solution or the TDM solution. For example, if the eNB 122 determines that the UE 100 has enough frequencies available to the UE 100 (for handover), the eNB 122 can allocate the FDM solution based on the measurement report from the UE 100. Otherwise, the eNB 122 may allocate the TDM solution to the UE 100.

The eNB 122 then sends (at 712) an IDC response with the selected IDC solution. The UE 100, in response to the IDC response, applies (at 714) the selected IDC solution.

Note that if the eNB 122 had initially decided (at 704) to use the TDM solution, then the eNB 122 would not send the measurement configuration request (at 706) to obtain FDM-related assistant information.

Figure 8:
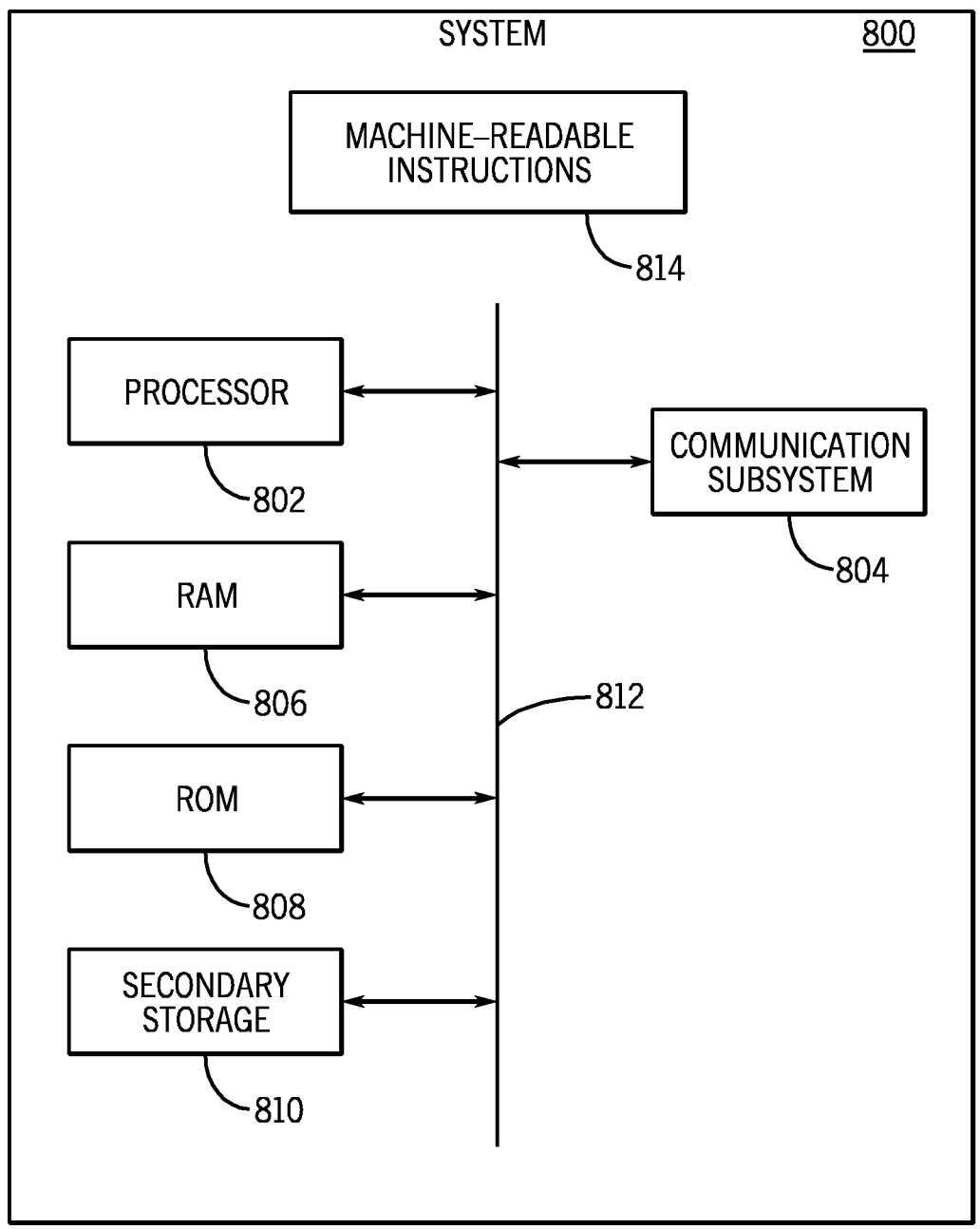
FIG. 8 is block diagram of a system that is capable of incorporating some implementations.

FIG. 8 illustrates an example system 800, which can either be the UE 100 or a wireless access node, such as 122 or 126 in FIG. 1. The system 800 can include a processor (or multiple processors) 802. A processor can include a microprocessor, microcontroller, processor module or subsystem, programmable integrated circuit, programmable gate array, or another control or computing device.

The system 800 can include a communication subsystem 804 to communicate over a wireless link. The system 800 can also include various storage media, including a random access memory (RAM) 806 (e.g. dynamic RAM or static RAM), read-only memory (ROM) 808 (e.g. erasable and programmable read-only memory (EPROM), electrically erasable and programmable read-only memory (EEPROM), or flash memory), and secondary storage 810 (e.g. magnetic or optical disk-based storage), and so forth. The various components can communicate with each other over one or more buses 812.

Machine-readable instructions 814 in the system 800 are executable on the processor(s) 802 to perform various tasks discussed above, either in the UE 100 or in a wireless access node. The machine-readable instructions 814 can be stored in any of the various storage media of the system 800.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A user equipment comprising:
   a communication subsystem including a plurality of wireless interfaces, the communication subsystem configured to transmit, to a wireless access node, an indication of in-device coexistence (IDC) interference between the wireless interfaces;
   a counter configured to track a number of transmissions having the indication of IDC interference; and
   a control module configured to reset the counter in response to receiving a response containing information relating to an IDC solution from the wireless access node, wherein the response is sent by the wireless access node in response to one of the transmissions having the indication of IDC interference.

2. The user equipment of claim 1, wherein the IDC interference results from a transmission by a first wireless interface in a first frequency band interfering with reception in a second frequency band by a second wireless interface.

3. The user equipment of claim 1, wherein the wireless interfaces include radio interfaces.

4. The user equipment of claim 1, wherein the communication subsystem is configured to transmit the indication of IDC interference in response to detection of the IDC interference at one of the wireless interfaces.

5. The user equipment of claim 1, wherein the communication subsystem is configured to transmit the indication of IDC interference in response to internal coordination between the wireless interfaces.

6. The user equipment of claim 1, wherein the counter is configured to advance with each transmission having the indication of IDC interference.

7. The user equipment of claim 6, wherein advancing the counter includes one of: incrementing the counter with each transmission having the indication of IDC interference, or decrementing the counter with each transmission having the indication of IDC interference.

8. The user equipment of claim 1,
   wherein the control module is configured to allow transmission of the indication of IDC interference in response to determining that the number of transmissions tracked by the counter is less than a maximum count.

9. The user equipment of claim 8, wherein the control module is configured to prevent transmission of the indication of IDC interference in response to the number of transmissions tracked by the counter exceeding the maximum count.

10. The user equipment of claim 8, wherein the control module is configured to send a message to the wireless access node with a suggested value of the maximum count.

11. The user equipment of claim 8, wherein the control module is configured to receive a message from the wireless access node with a value of the maximum count.

12. The user equipment of claim 8, further comprising:
    a storage medium configured to store a preconfigured system parameter containing the maximum count.

13. The user equipment of claim 1, wherein the indication of IDC interference contains a current value of the counter.

14. The user equipment of claim 1, wherein the control module is configured to advance a count of the counter in response to:
    receiving a rejection, from the wireless access node, of a transmitted indication of IDC interference, or
    lack of receipt of any response, from the wireless access node, to a transmitted indication of IDC interference.

15. A user equipment comprising:
    a communication subsystem including a plurality of wireless interfaces, the communication subsystem configured to transmit, to a wireless access node, an indication of in-device coexistence (IDC) interference between the wireless interfaces;
    a counter configured to track a number of transmissions having the indication of IDC interference, wherein the counter is configured to expire after counting a specified number of transmissions having the indication of IDC interference;
    a prohibit timer configured to specify a delay after the expiration of the counter; and
    a control module configured to wait the delay after the expiration of the counter before causing a reset of the counter.

16. The user equipment of claim 15, wherein the control module is configured to cause the reset of the counter by requesting a new value for the counter from the wireless access node.

17. The user equipment of claim 15, wherein the control module configured to cause reset of the counter by initializing the counter to a specified value.

18. A user equipment comprising:
    a communication subsystem including a plurality of wireless interfaces, the communication subsystem configured to transmit, to a wireless access node, an indication of in-device coexistence (IDC) interference between the wireless interfaces;
    a counter configured to track a number of transmissions having the indication of IDC interference, wherein the counter is configured to expire after counting a predefined number of transmissions having the indication of interferences; and
    a control module configured to request, from the wireless access node, a new value of the counter in response to the expiration of the counter.

19. A user equipment comprising:
    a communication subsystem including a plurality of wireless interfaces, the communication subsystem configured to transmit, to a wireless access node, an indication of in-device coexistence (IDC) interference between the wireless interfaces;
    a counter configured to track a number of transmissions having the indication of IDC interference; and
    a control module configured to, in response to the counter reaching a specified trigger value prior to expiration of the counter, send a request for a new value for the counter from the wireless access node.

20. The user equipment of claim 19, wherein the request is included in a message selected from among: a next transmission having the indication of IDC interference, a Radio Resource Control (RRC) message, and a Medium Access Control (MAC) Control Element (CE).

21. A method of a wireless access node, comprising:
    sending, to a user equipment, a message containing a parameter containing a value that specifies a number of permissible transmissions having an indication of in-device coexistence (IDC) interference at the user equipment, wherein the user equipment includes a counter to track a number of transmissions, sent by the user equipment, having the indication of IDC interference; and
    sending, to the user equipment, a response to one of the transmissions, the response containing information relating to an IDC solution and for causing reset of the counter that tracks the number of transmissions having the indication of IDC interference.

22. The method of claim 21, wherein the message is at least one selected from among:

a Radio Resource Control (RRC) message,
a response to the indication of IDC interference, and
a Medium Access Control (MAC) Control Element (CE).

23. The method of claim 21, further comprising:
setting the value based on at least one factor selected from among a load in a wireless coverage area of the wireless access node and a configuration set by a service provider of the wireless access node.

24. The method of claim 21, further comprising disabling or resetting the counter at the user equipment using a message sent to the user equipment, the counter to track a number of transmissions having the indication of IDC interference from the user equipment.

25. The method of claim 21, wherein the message is sent as part of a scheduling procedure or a load balancing procedure at the wireless access node.

26. A method of a wireless access node, comprising:
sending, to a user equipment, a message containing a parameter containing a value that specifies a number of permissible transmissions having an indication of in-device coexistence (IDC) interference at the user equipment;
receiving, from the user equipment, a count value of a number of transmissions having the indication of IDC interference from the user equipment;
comparing the count value to a value of a counter in the wireless access node that tracks a number of receipts of the indication of IDC interference from the user equipment; and
initiating a synchronization procedure to update the counter at the user equipment in response to the comparing indicating a mismatch.

\* \* \* \* \*